United States Patent
Wakamatsu

[19]
[11] Patent Number: 5,926,105
[45] Date of Patent: Jul. 20, 1999

[54] ROUTER HAVING A SECURITY FUNCTION

[75] Inventor: Youichi Wakamatsu, Kawasaki, Japan

[73] Assignee: Nitsuko Corporation, Kanagawa, Japan

[21] Appl. No.: 08/823,840

[22] Filed: Mar. 25, 1997

[30] Foreign Application Priority Data

Apr. 9, 1996 [JP] Japan .................................. 8-113075

[51] Int. Cl.⁶ .............................. G06F 7/04; H04L 12/28
[52] U.S. Cl. .................... 340/825.31; 370/401; 370/402; 370/420
[58] Field of Search .................... 370/401, 402, 370/420, 466, 474, 13, 16; 379/142, 88, 201, 245; 380/4, 49; 395/500, 187.01; 340/825.31, 825.34

[56] References Cited

U.S. PATENT DOCUMENTS 5,548,578  8/1996  Matsune et al. ........................... 370/13

*Primary Examiner*—Michael Horabik
*Assistant Examiner*—Jean B. Jeanglaude
*Attorney, Agent, or Firm*—Leydig, Voit & Mayer, Ltd.

[57] ABSTRACT

A router having a security function is provided for connecting a local area network (LAN) of a first local area through an interface network to other LAN's of other local areas, the router includes an ID register for preliminarily registering calling-party discrimination codes, and a discriminator for responding to an incoming call only when a calling-party discrimination code incoming through the interface network is determined to be identical to one of the registered calling-party discrimination codes in the ID register, wherein the discrimination code of a calling party from another LAN of another local area is checked to allow only an input from a registered calling party to be connected.

3 Claims, 2 Drawing Sheets

ROUTER HAVING A SECURITY FUNCTION

BACKGROUND OF THE INVENTION

This invention relates to a router having a function of security for mutually connecting local area networks (which shall be referred to hereinafter as "LAN's" or "LAN") respectively connecting between personal computers, work stations and so on belonging to each local area.

DESCRIPTION OF RELATED ART

The use of LAN for mutually connecting a Iplurality of the personal computers and work stations employed in such local area as a business office, entire office building, factory or the like to allow them to mutually exchange information has been known.

Because of recent development in information society as well as higher function of the computers and of their still reduced costs, their use and environment of employment have shown diverse variety, and it has become often that an access is made from a LAN of one local area to another LAN of another local area to mutually exchange information. For arrangements in which LAN's of respective local areas are mutually connected to allow the mutual exchange of information between such clients as personal computers included in different LAN's, there will be one in which the LAN of one local area covering the clients such as the personal computers, work stations and so on is connected to a router to which another LAN of another local area is connected, and another LAN of another local area to which the clients such as the personal computers, work stations and so on are connected through such interface network as an integrated service digital network (known as ISDN) having a function of notifying a calling party ID, that is, a calling-party discrimination code is connected to another router connected to the LAN of the one local area.

With the above arrangement, the connection through the interface network seemingly has enabled it possible to connect freely between the LAN's of different local areas. In the particular network system of this arrangement, however, there is a risk that, due to that a public communication network is normally utilized, any important or confidential information inside the LAN in one local area is transmitted to any third party who has nothing to do therewith. Accordingly, it has been required to transmit the information after confirmation whether or not the other party to be connected through the interface network is a desired receiving party.

Here, it has been taken such measures for the confirmation as a filtering by means of such packet data as MAC (Media Access Control) or IP (Internet Protocol) addresses, encryption of signals, calling-back and the like as a security check of interconnection of LAN's. The IP addresses are numbers for discriminating the computer or any other communication equipment to be connected to TCP/IP network, and are effectively utilizable for the confirmation since no computer having the same IP address is present.

The above measures for the security check are, however, still troublesome in that excessive communication time has to be wasted for performing the confirmation after the connection of circuit, and repeating the confirmation again after re-connection of the circuit, so that the communication will be costly more than actually required. Further, the encripted signals still involve a risk of being descripted by a third party.

SUMMARY OF THE INVENTION

An object of the present invention is, therefore, to provide a router having a function of security, which is capable of overcoming the foregoing problems, inspecting the discrimination code of a calling party provided by the interface network upon receipt at the LAN of one local area of signals from another LAN of another local area, and thus shortening the required communication time to reduce required communication costs by connecting the LAN of the one local area only to the particular LAN of the calling party in another local area.

According to the present invention, the above object can be realized by means of a router having a function of security, comprising a LAN of one local area connectable to another LAN of another local area desired to communicate, a router having a function of security for connecting the LAN of the one local area through an interface network to said another LAN desired of another local area, an ID register means for preliminarily registering therein discrimination codes of calling parties, and a discriminating means included in the router for responding to signals received when a discrimination code of the calling party and received from the interface network coincides with one of the discrimination codes registered in the ID register means of the calling parties.

Other objects and advantages of the present invention shall become clear as the description of the invention advances as detailed with reference to an embodiment shown in accompanying drawings.

While the present invention should now be described with reference to the embodiment shown in the accompanying drawings, it should be appreciated that the intention is not to limit the invention only to the embodiment shown but rather to include all alterations, modifications and equivalent arrangements possible within the scope of appended claims.

DETAILED DESCRIPTION OF THE PREFERRED EMBODIMENT

Figure 1:
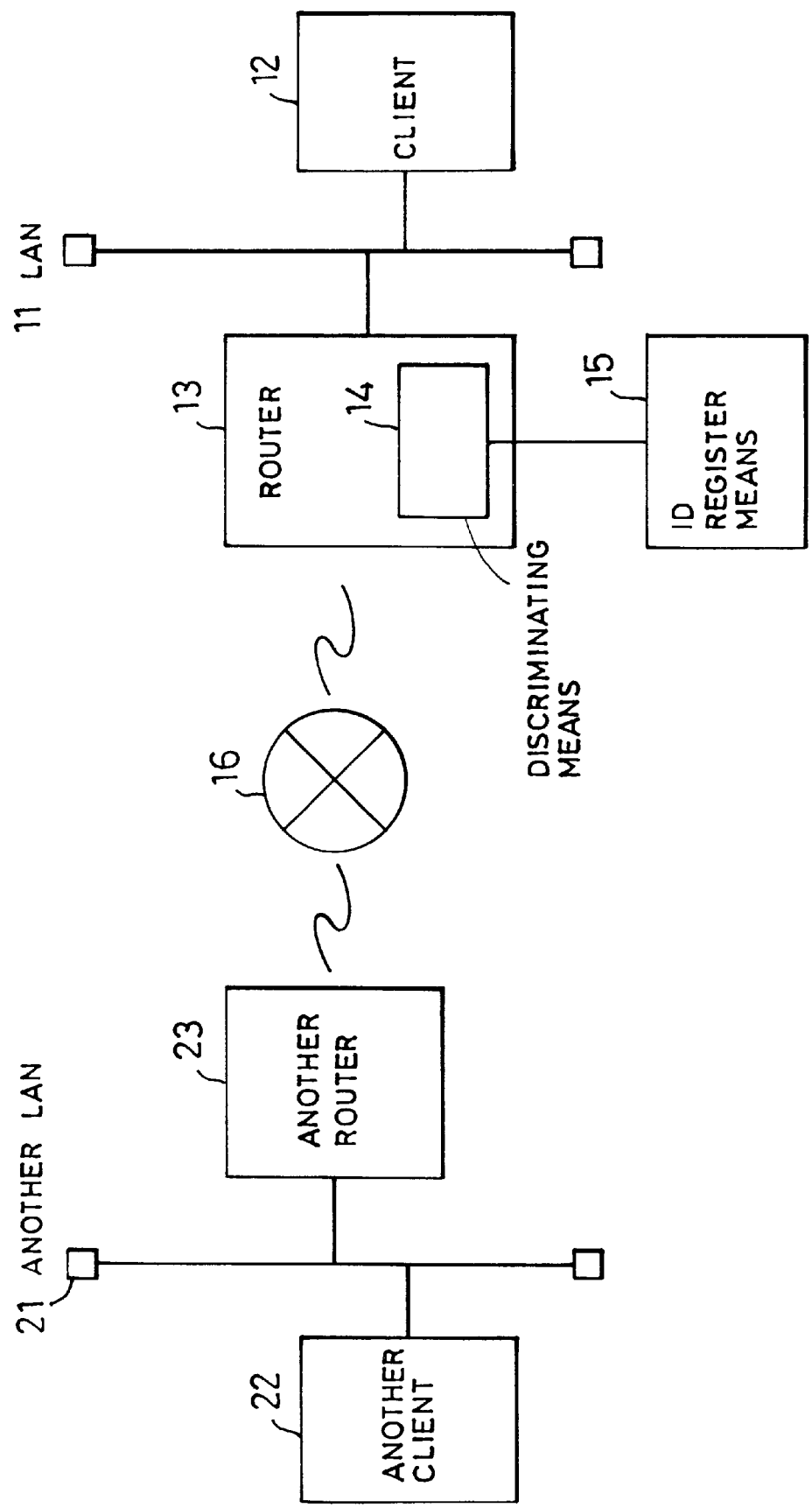
FIG. 1 is a block diagram showing a working aspect of a network employing a router having a function of security in an embodiment according to the present invention.

The present invention shall now be described with reference to the drawings showing an embodiment of the invention. Referring to FIG. 1, a network employing the router having the function of security according to the present invention is shown in a block diagram. In this case, a LAN 11 of a local area is connected to such client 12 as the personal computer, work station or other communication equipment. Further, the LAN 11 is connected to a router 13 for connection to another LAN 21 of another local area 21, while the router 13 incorporates therein a discriminating means 14, to which an ID register means 15 is connected. Further, the router 13 connects the LAN 11 of the one local area to an interface network 16 when signals area provided or received upon communication with another LAN 21 of another local area.

Another LAN 21 of another local area is also connected to another client 22 such as the personal computer, work station or other communication equipment, similarly to the LAN 11 of the one local area, and also to another router 23 for an access to the LAN 11 of the one local area.

The above ID register means 15 is constituted by such semiconductor storage element as RAM or such storage medium as magnetic disk and optical disk, and houses calling-party discrimination codes of other parties to which access is required and which are provided by the client 12 or either one of a server and an exclusive-use input device (not shown). Here, while the ID register means 15 is shown as provided outside the router 13, it is possible to house the means 15 in the router 13 in practice so long as the storage medium is of a small type. When the ID register means 15 is thus arranged to be integral with the router 13, the network is rendered requiring less space and excellent in such workability as assembling work.

Further, upon receipt of incoming signals through the interface network 16, the discriminating means 14 discriminates whether or not the discrimination code provided by the interface network 16 coincides with one of the calling-party discrimination codes stored and thus registered in the ID register means 15 so that the incoming signals in the coincidence will be received but the ones not in the coincidence will be blocked.

As has been described, only the incoming signals from specific another LAN 21 of another local area preliminarily registered are to be connected to the router 13, so that required communication costs can be reduced and the effect of security can be remarkably increased. Further, while the ID register means 15 has been referred to as being constituted by the storage medium, it will be possible to employ, as the ID register means 15 to be connected to the router 13 through a predetermined communication means, a note-book type personal computer or the like provided with such storage medium as a hard disk, floppy disk and the like. By the use of such note-book type personal computers, it is enabled to render the access to the storage medium easier, and an input and output operation or their administration of the calling-party discrimination codes simpler.

Figure 2:
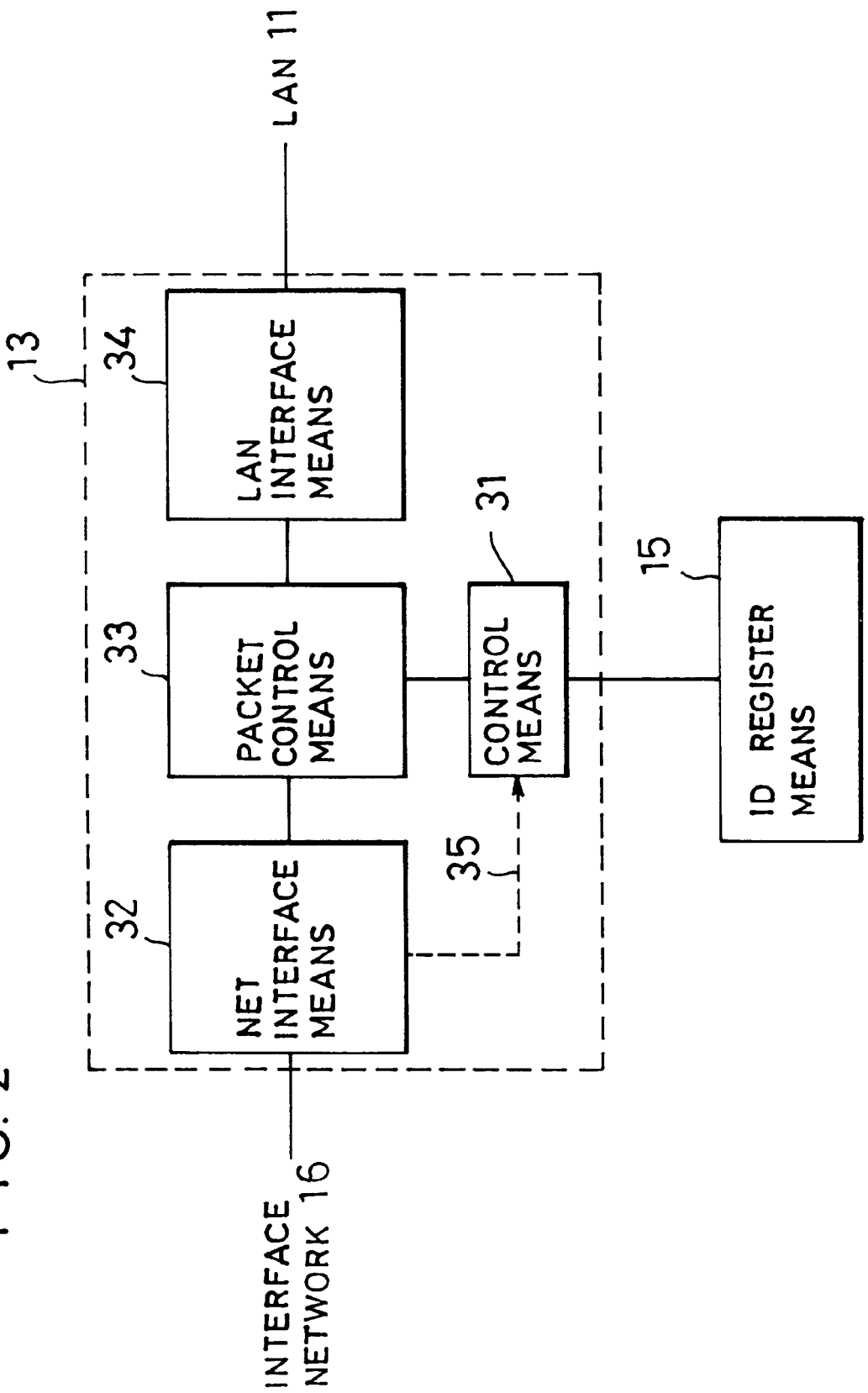
FIG. 2 is a block diagram showing a practical example of an arrangement of the router shown in FIG. 1.

Further, a more practical working aspect of the present invention shall be described with reference to the block diagram of FIG. 2.

The discriminating means 14 incorporated in the router 13 is provided with a control means 31 constituted by a processor, its peripheral parts, control program and so on, whereas the control means 31 includes a net interface means 32, a packet control means 33 having such function as time-division multiplex switching, and a LAN interface means 34, and is provided for receiving as inputs calling-party discrimination codes (calling party ID's) 35 from the net interface means 32.

The above router 13 constitutes a device for connecting between the LAN 11 of one local area and another LAN 21 of another local area through the interface network 16, so that the router will have a function of selecting a trunk line of packets flowing through the LAN 11 of the one local area, as well as a function of processing lower three layers (physical, data-link and network layers) of basic reference model of OSI (Open Systems Interconnection), along with the routing.

Here, the net interface means 32 is provided with such physical means as connectors for connection to such interface network 16 as ISDN as well as a data processing means for processing and analyzing communication protocol. The LAN interface means 34 is provided with required physical means such as connectors for connection to the LAN 11 of one local area as well as a signal processing means such as one having required function for transmitting and receiving the packets in the present instance. The packet control means 33 has a required change-over function for the routing to control the transmission and reception of the packets between the LAN 11 of one local area and the interface network 16. Further, the control means 31 controls the operation of the respective means of the router 13 and supervises signals from the interface network 16, so as to realize the routing function for leading predetermined signals only to the interior of the LAN 11 of one local area.

References shall be made next to the operation of access by the client 22 connected with another LAN 21 in another local area to the client 12 of the LAN 11 in one local area, within the network employing the router 13 of such constitution as in the above. In FIG. 1, the transmitted signal from the client 22 of another LAN 21 in another local area reaches the net interface means 32 through a path of another LAN 21 of another local area→another router 23→interface network 16→router 13→net interface means 32, upon which a calling-party discrimination code of the client 22 of another LAN 21 in another local area as being a calling party is added to the transmitted signal by the ISDN circuit which forming the interface network 16.

The above net interface means 32 detects the calling-party discrimination code 35 out of the received signal and provides the code to the control means 31. As the calling-party discrimination code 35 is received, the control means 31 retrieves the calling-party discrimination codes registered in the ID register means 15, and discriminates whether or not there is one coinciding with the calling-party discrimination code of the received signal, that is, whether or not the code of the received signal has been already registered. In the event where the calling-party discrimination code of the received signal is registered, the control means 31 causes the packet control means 33 to connect the net interface means 32 to the LAN interface means 34.

As a result, the packet data are conveyed to the LAN interface means 34 and are made to reach the client 12 through the LAN 11 of one local area. Further, in an event where the calling-party discrimination code 35 is not registered, the control means 31 causes the packet control means 33 not to connect between the net and LAN interface means 32 and 34, and the packet data can be blocked from being received by the client 12.

The control means 31 at this time may be made to provide to the client 22 of another local area as being the other party, through the net interface means 32, a message of incapability of connection as a result of security check, or any other information. Further, it should be appreciated that, with this arrangement employed, it is made possible that another client 22 of another LAN 21 can easily know the reason for the incapability of connection, and that any unnecessary connection due to a forbearance is avoided.

Since the other party to be connected is thus inspected by means of the router 13 as being a lead-in end of the LAN 11 in one local area so as to restrict the other party to be connected to another LAN 21 of specific another local area, any connection to the other party unnecessary can be avoided and the security administration can be executed highly efficiently.

What is claimed is:

1. A router having a function of security for connecting a first LAN of a first local area through an interface network to a second LAN in a second local area, the router comprising:

ID register means for preliminarily registering therein discrimination codes of calling parties assigned to a second LAN in a second local area, with which connection to a first LAN in a first local area is desirable; and discriminating means for connecting the second LAN in the second local area to the first LAN in the first local area in response to signals received from a calling party only upon determination of coincidence of a discrimination code of the calling party of the second LAN in the second local area, received through an interface network connecting the first LAN in the first local area to the second LAN in the second local area, with one of the discrimination codes of the calling party registered in the ID register means.

2. The router according to claim 1 wherein the discriminating means comprises:

net interface means connected to the interface network;

packet control means connected to the net interface means and to the ID register means for controlling reception and transmission of a packet of data transmitted between the first LAN in the first local area and the interface network; and LAN interface means connecting the packet control means to the first LAN in the first local area, so that, when the discrimination code of the calling party contained in a packet of data that the net interface means has received from the second LAN in the second local area is sent through the packet control means to the ID register means and is determined to coincide with one of the discrimination codes registered in the ID register means, the packet of data that the net interface means has received from the second LAN in the second local area is sent through the packet control means and the LAN interface means to the first LAN in the first local area.

3. The router according to claim 1 wherein the first ID register means and the discriminating means are housed in the router connected to the LAN of the one local area.

* * * * *